US012687050B2

(12) United States Patent
Tostado et al.

(10) Patent No.: US 12,687,050 B2
(45) Date of Patent: Jul. 21, 2026

(54) VEHICLE DOOR LATCH WITH DOUBLE LOCK FUNCTION

(71) Applicant: INTEVA PRODUCTS, LLC, Troy, MI (US)

(72) Inventors: Carlos Tostado, Juarez (MX); Eduardo Estrada, Juarez (MX)

(73) Assignee: INTEVA PRODUCTS, LLC, Troy, MI (US)

(*) Notice: Subject to any disclaimer, the term of this patent is extended or adjusted under 35 U.S.C. 154(b) by 137 days.

(21) Appl. No.: 18/219,925

(22) Filed: Jul. 10, 2023

(65) Prior Publication Data

US 2024/0011335 A1 Jan. 11, 2024

Related U.S. Application Data

(60) Provisional application No. 63/359,523, filed on Jul. 8, 2022.

(51) Int. Cl.
*E05B 81/16* (2014.01)
*E05B 81/36* (2014.01)
*E05B 81/50* (2014.01)

(52) U.S. Cl.
CPC .............. *E05B 81/16* (2013.01); *E05B 81/36* (2013.01); *E05B 81/50* (2013.01)

(58) Field of Classification Search
CPC ........ E05B 77/24; E05B 77/245; E05B 77/26; E05B 77/265; E05B 77/28; E05B 81/16; E05B 81/34; E05B 81/36; E05B 81/50
See application file for complete search history.

(56) References Cited

U.S. PATENT DOCUMENTS

| | | | | | |
|---|---|---|---|---|---|
| 5,474,338 | A * | 12/1995 | Buscher | E05B 77/28 | 292/201 |
| 5,497,640 | A * | 3/1996 | Kokuryo | E05B 77/28 | 70/279.1 |
| 6,053,543 | A * | 4/2000 | Arabia, Jr | E05B 77/28 | 292/216 |
| 6,416,088 | B1 * | 7/2002 | Graute | E05B 77/28 | 292/201 |
| 7,926,857 | B2 * | 4/2011 | Akizuki | E05B 77/26 | 292/216 |

(Continued)

FOREIGN PATENT DOCUMENTS

| | | | | |
|---|---|---|---|---|
| CN | 222045414 U | | 11/2024 | |
| DE | 102020128302 A1 | * | 5/2021 | E05B 77/26 |

(Continued)

OTHER PUBLICATIONS

Non-Final Office Action dated Nov. 24, 2023.

(Continued)

*Primary Examiner* — Alyson M Merlino
(74) *Attorney, Agent, or Firm* — CANTOR COLBURN LLP

(57) ABSTRACT

A vehicle latch, including: a first locking mechanism configured to disengage an outside release lever of the vehicle latch from a pawl of the vehicle latch; and a double lock mechanism configured to disengage an inside release lever from the pawl of the vehicle latch such that when the double lock mechanism is actuated into a locked state, movement of the inside release lever will not release the vehicle latch.

12 Claims, 12 Drawing Sheets

(56) References Cited

U.S. PATENT DOCUMENTS

| | | | | |
|---|---|---|---|---|
| 8,146,965 | B2 * | 4/2012 | Akizuki | E05B 77/28 292/216 |
| 8,151,610 | B2 * | 4/2012 | Fujihara | E05B 81/36 292/201 |
| 8,267,444 | B2 * | 9/2012 | Akizuki | E05B 77/26 292/216 |
| 8,388,030 | B2 * | 3/2013 | Takahashi | E05B 77/26 292/216 |
| 8,757,680 | B2 * | 6/2014 | Byun | E05B 77/28 292/216 |
| 10,214,945 | B2 * | 2/2019 | Cetnar | E05B 81/36 |
| 10,370,879 | B2 * | 8/2019 | Tomaszewski | E05B 77/28 |
| 10,400,484 | B2 | 9/2019 | Didier et al. | |
| 10,450,782 | B2 | 10/2019 | Nurmi et al. | |
| 10,465,424 | B2 | 11/2019 | Ishiguro et al. | |
| 10,858,866 | B2 | 12/2020 | Madrid et al. | |
| 10,961,752 | B2 | 3/2021 | Borlodan et al. | |
| 11,072,949 | B2 | 7/2021 | Strole et al. | |
| 11,401,739 | B2 * | 8/2022 | Suholutskaja | E05B 77/265 |
| 11,414,898 | B2 * | 8/2022 | Okuyama | E05B 77/265 |
| 11,441,336 | B2 * | 9/2022 | Nam | E05B 77/28 |
| 11,441,339 | B2 | 9/2022 | Iwata et al. | |
| 11,459,803 | B2 * | 10/2022 | Tametani | E05B 77/26 |
| D978,748 | S | 2/2023 | Guevara Arreola et al. | |
| D987,749 | S | 5/2023 | Tsuchihashi | |
| 11,746,570 | B2 * | 9/2023 | Escamilla Hernandez | E05B 77/26 292/216 |
| 11,753,853 | B2 | 9/2023 | Guevara Arreola et al. | |
| 11,767,688 | B2 * | 9/2023 | Akagi | E05B 77/26 292/201 |
| 11,795,738 | B2 | 10/2023 | Ney | |
| 12,031,360 | B2 | 7/2024 | Thompson | |
| 2001/0024040 | A1 | 9/2001 | Spurr | |
| 2003/0030287 | A1 | 2/2003 | Fisher | |
| 2005/0082842 | A1 * | 4/2005 | Warmke | E05B 77/28 292/216 |
| 2006/0284426 | A1 | 12/2006 | Bigazzi et al. | |
| 2010/0283268 | A1 | 11/2010 | Cumbo | |
| 2011/0101707 | A1 * | 5/2011 | Perkins | E05B 81/36 292/201 |
| 2015/0061301 | A1 | 3/2015 | Torka et al. | |
| 2015/0315824 | A1 | 11/2015 | Gotzen et al. | |
| 2018/0216370 | A1 | 8/2018 | Ishiguro et al. | |
| 2018/0371805 | A1 * | 12/2018 | Ichinose | E05B 77/26 |
| 2019/0376321 | A1 | 12/2019 | Estrada Lazcano et al. | |
| 2020/0011094 | A1 | 1/2020 | Guevara Arreola et al. | |
| 2020/0277808 | A1 * | 9/2020 | Seo | E05B 77/26 |
| 2022/0042352 | A1 | 2/2022 | Ney et al. | |
| 2022/0275667 | A1 | 9/2022 | Guevara Arreola et al. | |
| 2022/0275670 | A1 | 9/2022 | Guevara Arreola et al. | |

FOREIGN PATENT DOCUMENTS

| | | | | | |
|---|---|---|---|---|---|
| EP | 1884610 | A2 | * | 2/2008 | E05B 77/28 |
| EP | 2112306 | A2 | * | 10/2009 | E05B 77/26 |
| EP | 2369103 | A2 | * | 9/2011 | E05B 77/245 |
| EP | 3832056 | A1 | * | 6/2021 | E05B 77/02 |
| GB | 1408441 | A | | 10/1975 | |
| GB | 2365487 | A | * | 2/2002 | E05B 77/28 |
| GB | 2415740 | A | * | 1/2006 | E05B 77/28 |
| JP | 2005126923 | A | * | 5/2005 | E05B 77/28 |
| WO | WO-2009030046 | A1 | * | 3/2009 | E05B 77/26 |
| WO | 2013170363 | A1 | | 11/2013 | |
| WO | WO-2019016974 | A1 | * | 1/2019 | E05B 77/28 |
| WO | WO-2020129542 | A1 | * | 5/2020 | E05B 77/26 |

OTHER PUBLICATIONS

US Non-Final Office Action corresponding to U.S. Appl. No. 29/847,306; Issue Date, Oct. 29, 2024, 21 pages.

CNIPA Notification of the First Office Action corresponding to CN Application No. 202211519738.X; Issue date, Aug. 23, 2025, 18 pages.

Chinese Notification of Second Office Action corresponding to CN Application No. 202310836184.4; Issue date, Jan. 13, 2026, 3 pages.

* cited by examiner

VEHICLE DOOR LATCH WITH DOUBLE LOCK FUNCTION

CROSS REFERENCE TO RELATED APPLICATIONS

The present application claims the benefit of U.S. Provisional Patent Application Ser. No. 63/359,523 filed on Jul. 8, 2022 the entire contents of which are incorporated herein by reference thereto.

TECHNICAL FIELD

Exemplary embodiments of the present disclosure pertain to the art of vehicle latches.

BACKGROUND

Vehicle latches include a locking mechanism where an outside release handle of the vehicle latch is unable to open the vehicle latch (locked state) however and in some applications when the vehicle latch is in a locked state the inside release handle may open the vehicle latch. In some applications it may be desirable to provide a second locking mechanism wherein the inside release handle is also unable to open the vehicle latch.

Accordingly, it is desirable to provide a vehicle latch with a double lock mechanism.

BRIEF DESCRIPTION

Disclosed is a vehicle latch, including: a first locking mechanism configured to disengage an outside release lever of the vehicle latch from a pawl of the vehicle latch; and a double lock mechanism configured to disengage an inside release lever from the pawl of the vehicle latch such that when the double lock mechanism is actuated into a locked state, movement of the inside release lever will not release the vehicle latch.

In addition to one or more of the features described above, or as an alternative to any of the foregoing embodiments, wherein the first locking mechanism also includes a motor for driving a worm that rotates a gear, and the double lock mechanism includes a motor for driving a worm gear that meshingly engages a sector gear such that rotation of the worm by motor will cause rotational movement of the sector gear.

In addition to one or more of the features described above, or as an alternative to any of the foregoing embodiments, the double lock mechanism also includes a double lock link operably coupled to the sector gear at one end and a double lock lever at an opposite end, the double lock lever being rotationally mounted to a latch housing of the vehicle latch such that rotational movement of the sector gear will cause rotational movement of the double lock lever.

In addition to one or more of the features described above, or as an alternative to any of the foregoing embodiments, rotational movement of the double lock lever will cause rotational movement of an intermittent lever rotationally mounted to the latch housing.

In addition to one or more of the features described above, or as an alternative to any of the foregoing embodiments, the double lock mechanism also includes an over center spring having one end operably coupled to the sector gear and another end secured to an actuator housing of the vehicle latch.

In addition to one or more of the features described above, or as an alternative to any of the foregoing embodiments, the intermittent lever includes a feature for contacting a corresponding feature of a pawl lifter of the vehicle latch, the pawl lifter being rotationally mounted to the latch housing and operably coupled to the pawl such that rotation of the pawl lifter will cause the pawl to move from an engaged position where the pawl engages a claw pivotally mounted to a backing plate of the vehicle latch to an disengaged position where the claw is free to rotate from a latched position to an unlatched position.

In addition to one or more of the features described above, or as an alternative to any of the foregoing embodiments, operation of the double lock mechanism is independent of the first locking mechanism.

In addition to one or more of the features described above, or as an alternative to any of the foregoing embodiments, the double lock mechanism also includes a manual release mechanism, the manual release mechanism having a key cylinder lever rotationally mounted to a latch housing of the vehicle latch.

In addition to one or more of the features described above, or as an alternative to any of the foregoing embodiments, the double lock mechanism also includes a manual release mechanism, the manual release mechanism having a key cylinder lever rotationally mounted to a latch housing of the vehicle latch and the key cylinder lever rotates about an axis that is the same as an axis of rotation of the double lock lever.

In addition to one or more of the features described above, or as an alternative to any of the foregoing embodiments, the double lock mechanism also includes a manual release mechanism, the manual release mechanism having a key cylinder lever rotationally mounted to a latch housing of the vehicle latch and the key cylinder lever rotates about an axis that is the same an axis of rotation of the double lock lever, the key cylinder lever including a tab portion that is located between a pair of features of the double lock lever, wherein the pair of features of the double lock lever are spaced from each other such that movement of the double lock lever by the motor of the double lock mechanism may occur without contacting the tab portion of the key cylinder lever.

In addition to one or more of the features described above, or as an alternative to any of the foregoing embodiments, the key cylinder lever includes a coupler secured thereto, the coupler extending from a cover of the vehicle latch and the coupler is secured to a rod, the rod allowing for a manual override of the double lock mechanism.

In addition to one or more of the features described above, or as an alternative to any of the foregoing embodiments, the double lock lever of the double lock mechanism operates independently of a lever of the first locking mechanism.

In addition to one or more of the features described above, or as an alternative to any of the foregoing embodiments, the lever of the first locking mechanism is rotated by the gear of the first locking mechanism.

Also disclosed is a method of double locking a vehicle latch, including: disengaging an outside release lever of the vehicle latch from a pawl of the vehicle latch with a first locking mechanism; and disengaging an inside release lever from the pawl of the vehicle latch with a double lock mechanism such that when the double lock mechanism is actuated into a locked state movement of the inside release lever will not release the vehicle latch.

In addition to one or more of the features described above, or as an alternative to any of the foregoing embodiments, the first locking mechanism also includes a motor for driving a worm that rotates a gear, and the double lock mechanism includes a motor for driving a worm gear that meshingly engages a sector gear such that rotation of the worm by motor will cause rotational movement of the sector gear.

In addition to one or more of the features described above, or as an alternative to any of the foregoing embodiments, the double lock mechanism also includes a double lock link operably coupled to the sector gear at one end and a double lock lever at an opposite end, the double lock lever being rotationally mounted to a latch housing of the vehicle latch such that rotational movement of the sector gear will cause rotational movement of the double lock lever.

In addition to one or more of the features described above, or as an alternative to any of the foregoing embodiments, rotational movement of the double lock lever will cause rotational movement of an intermittent lever rotationally mounted to the latch housing.

In addition to one or more of the features described above, or as an alternative to any of the foregoing embodiments, the double lock mechanism also includes an over center spring having one end operably coupled to the sector gear and another end secured to an actuator housing of the vehicle latch.

In addition to one or more of the features described above, or as an alternative to any of the foregoing embodiments, the intermittent lever includes a feature for contacting a corresponding feature of a pawl lifter of the vehicle latch, the pawl lifter being rotationally mounted to the latch housing and operably coupled to the pawl such that rotation of the pawl lifter will cause the pawl to move from an engaged position where the pawl engages a claw pivotally mounted to a backing plate of the vehicle latch to an disengaged position where the claw is free to rotate from a latched position to an unlatched position.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
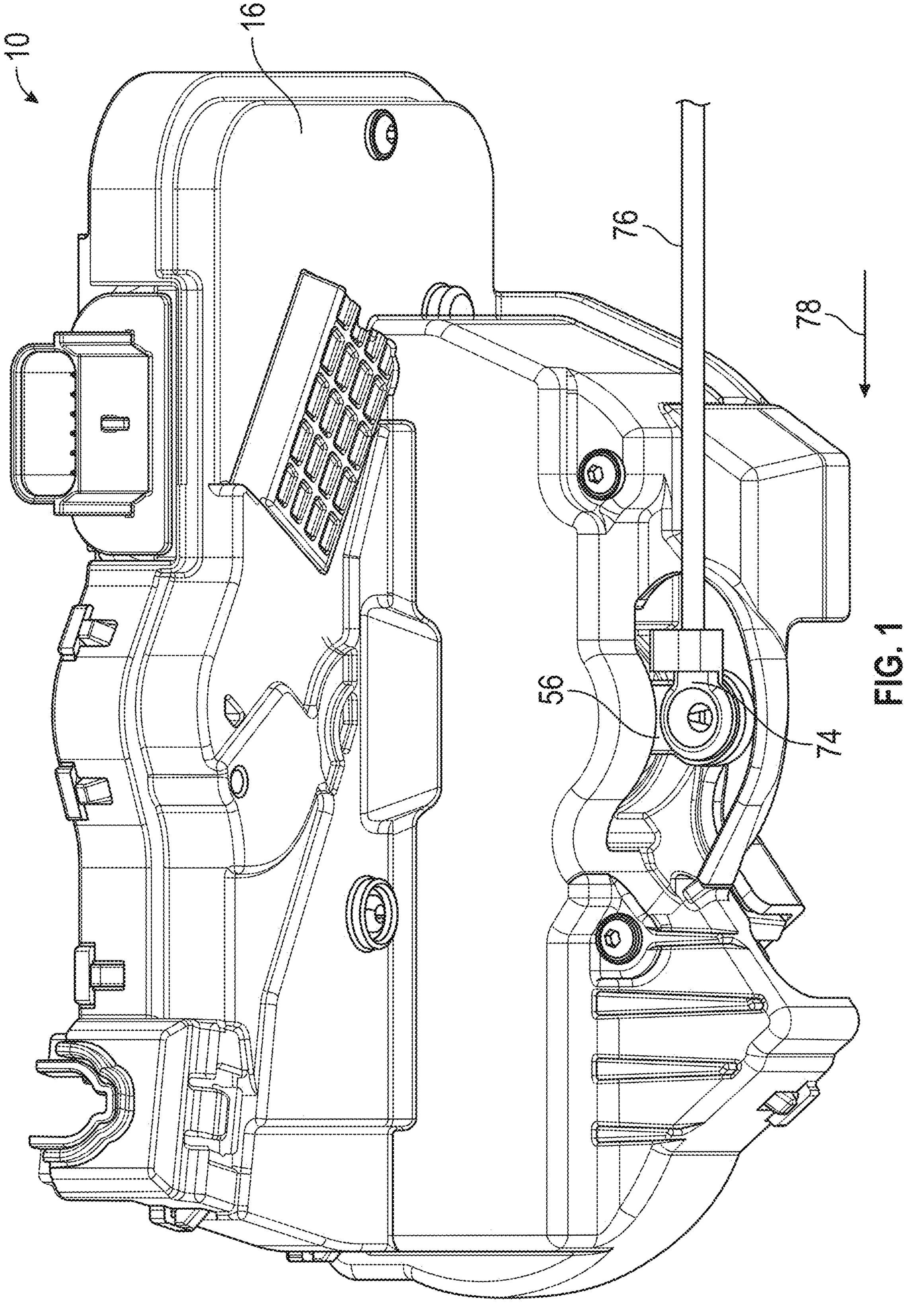
FIG. 1 is a top perspective view of a vehicle latch in accordance with the present disclosure.
Figure 2:
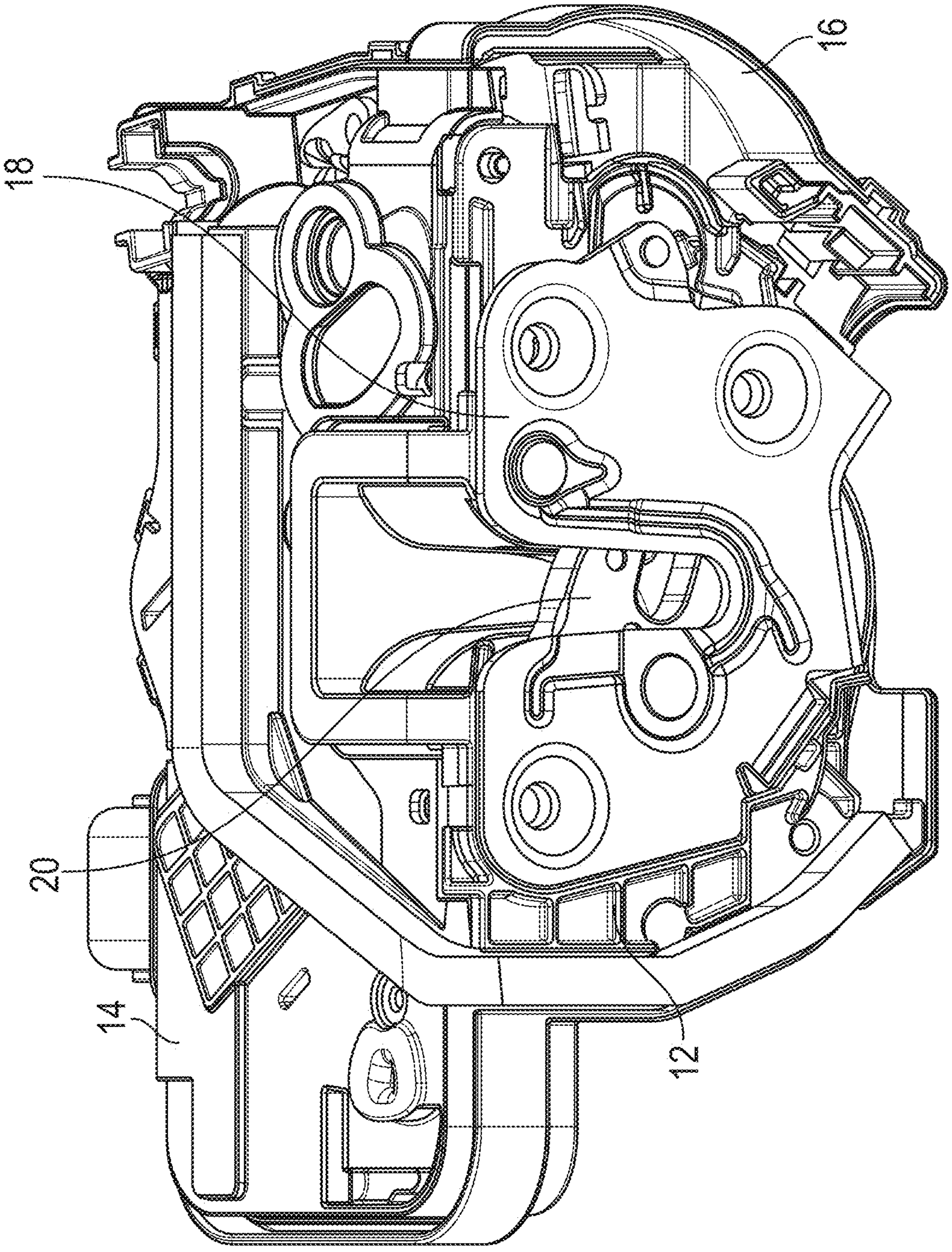
FIG. 2 is a bottom perspective view of a vehicle latch in accordance with the present disclosure.
Figure 11:
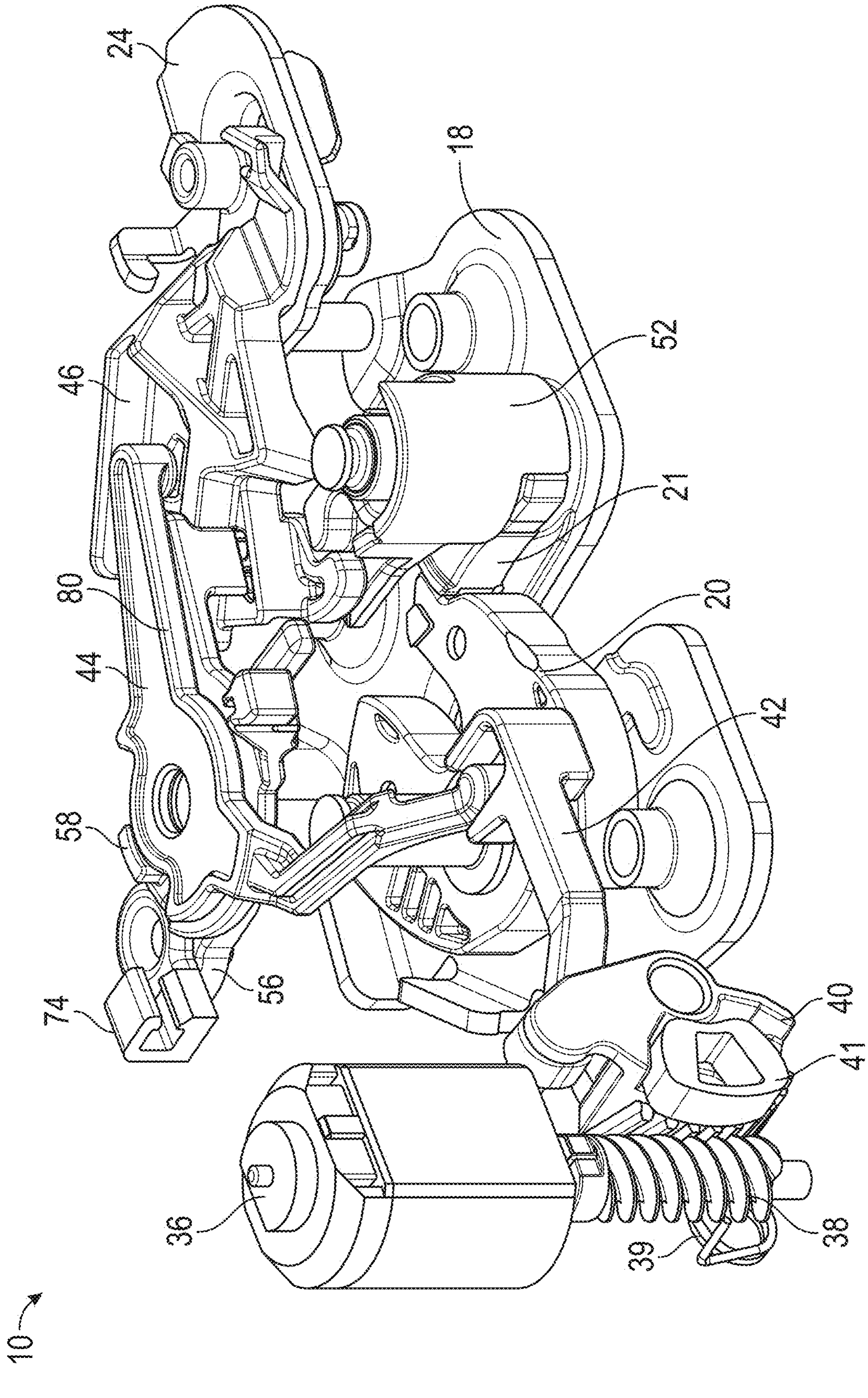
FIG. 11 is a perspective view of portions of the vehicle latch with a double lock mechanism of the present disclosure.
Figure 12:
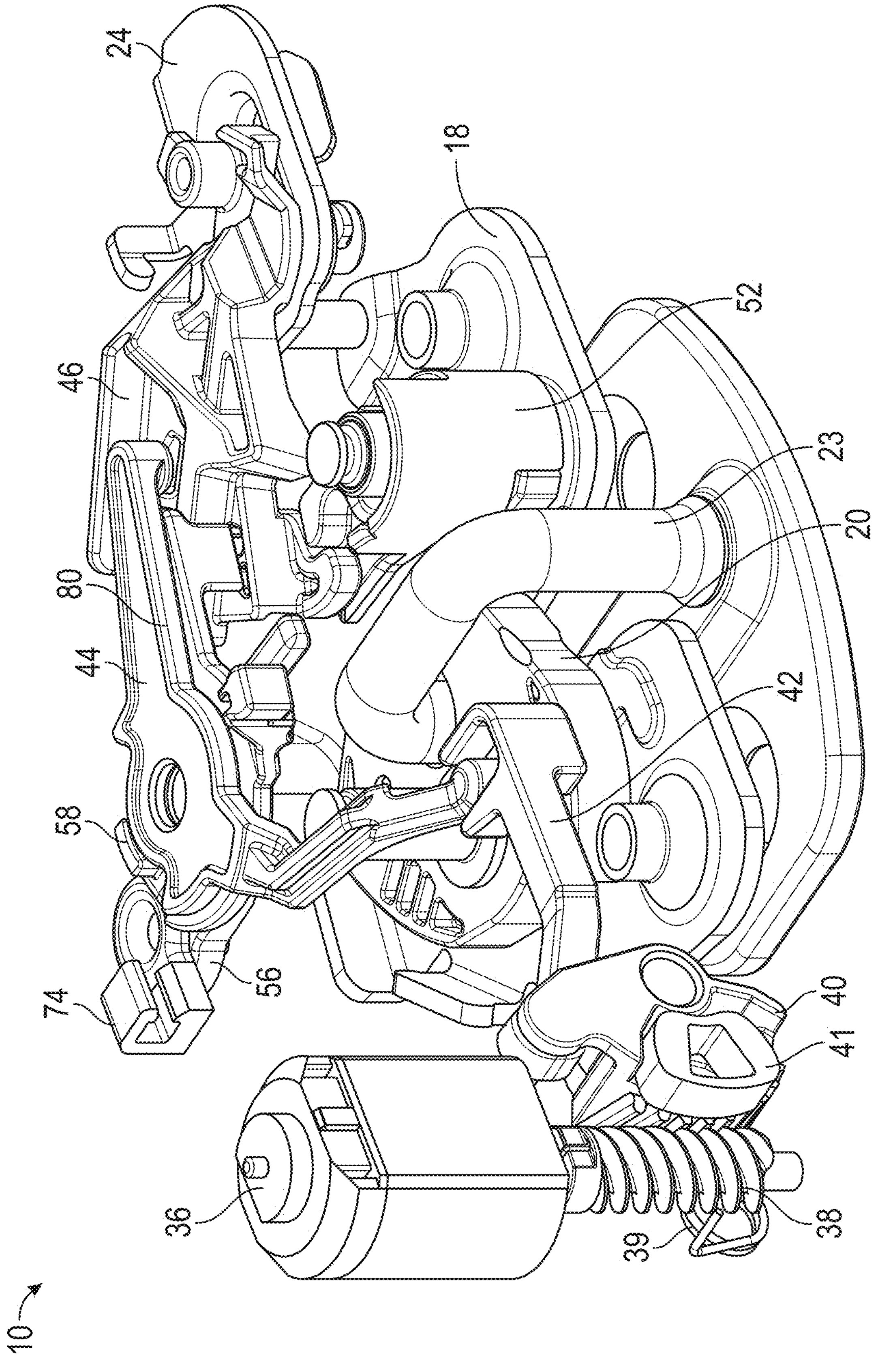
FIG. 12 is a perspective view of portions of the vehicle latch with a double lock mechanism of the present disclosure while the latch is engaging a striker.

FIG. 1 is a top perspective view of a vehicle latch 10 in accordance with the present disclosure and FIG. 2 is a bottom perspective view of a vehicle latch in accordance with the present disclosure. The vehicle latch 10 illustrated in the attached FIGS. is a front door vehicle latch however various embodiments of the present disclosure are applicable to front and/or rear vehicle door latches. As illustrated in FIGS. 1 and 2, the vehicle latch 10 includes a latch housing 12, an actuator housing 14, and a cover 16 configured to cover the latch housing 12 and the actuator housing 14. Also shown is a backing plate 18, that is secured to the latch housing 12. A claw 20 and a pawl 21 are pivotally secured to the backing plate 18 as is known in the related arts. The claw 20 is pivotally or rotationally mounted to the backing plate 18 for movement between a latched position wherein a striker 23 (see at least FIG. 11) of a vehicle is retained by the vehicle latch 10 and an unlatched position wherein the striker is released from the vehicle latch 10. The pawl is also pivotally or rotationally secured to the backing plate 18 for movement between an engaged position wherein the pawl retains the claw 20 in the latched position and disengaged position wherein the pawl no longer retains the claw 20 in the latched position such that the claw can rotate or pivot into the unlatched position.

Figure 3:
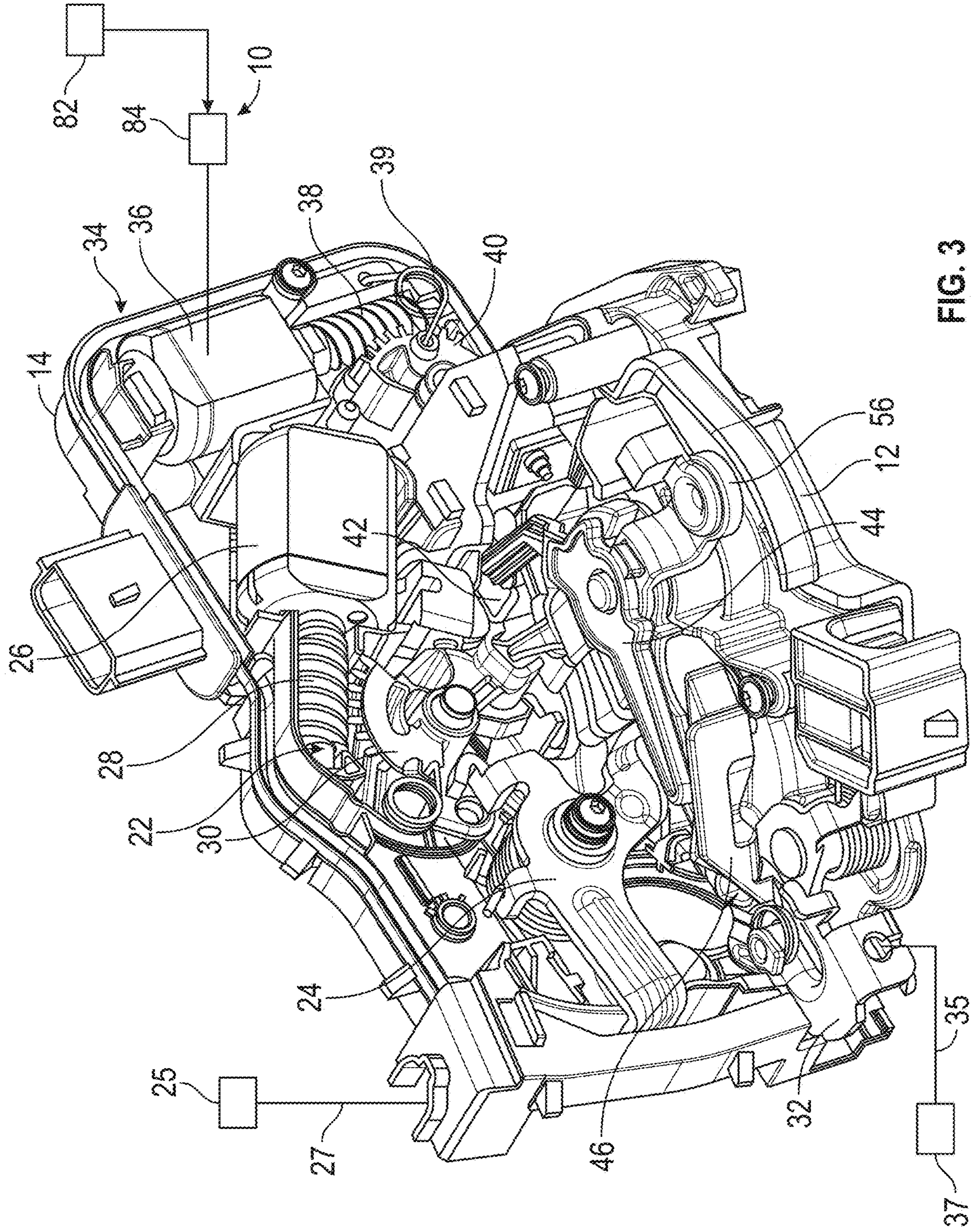
FIG. 3 is a top perspective view of a vehicle latch with the cover removed in accordance with the present disclosure.
Figure 4:
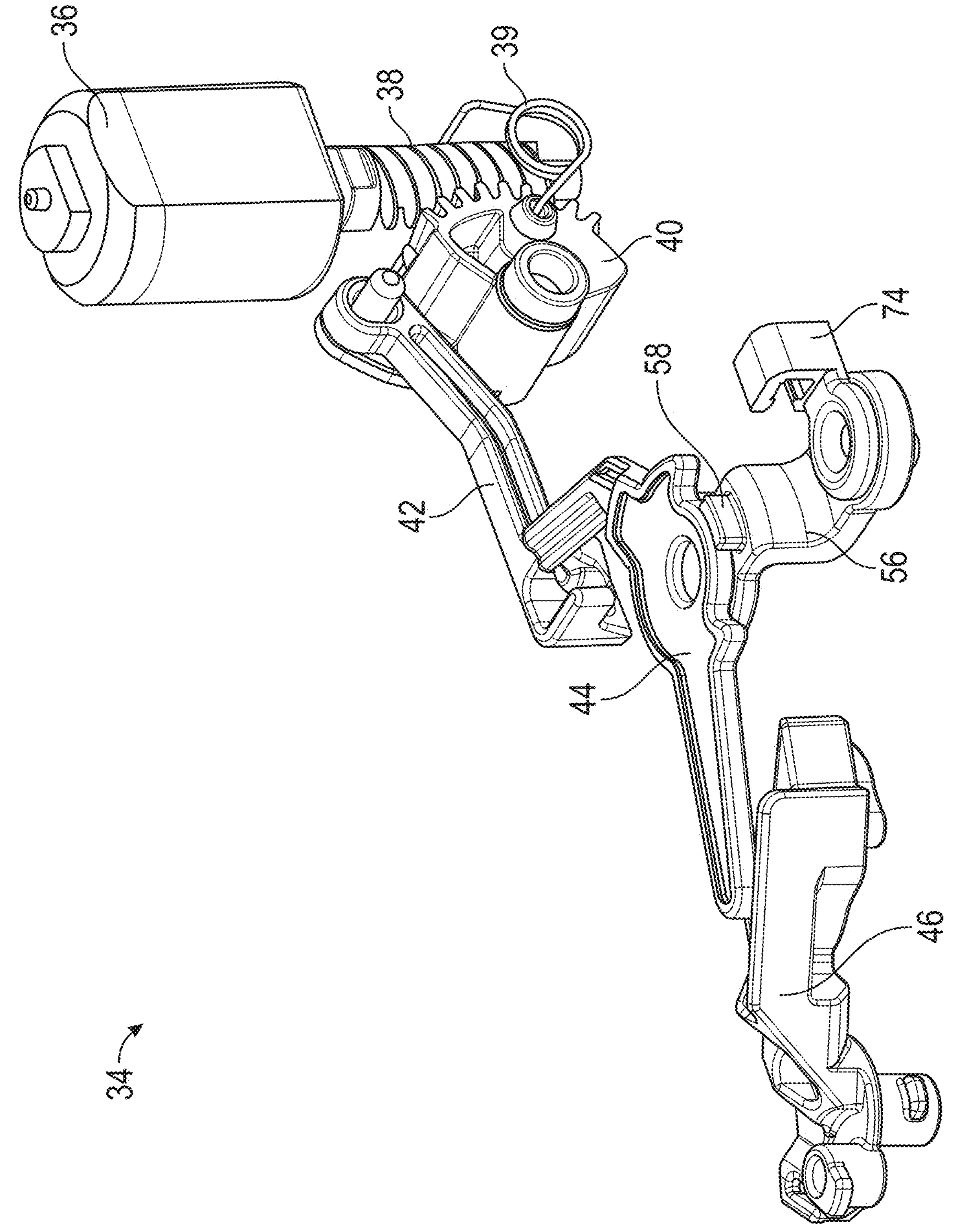
FIG. 4 illustrates the double lock mechanism in accordance with the present disclosure.

FIG. 3 is a top perspective view of a vehicle latch with the cover 16 removed from the housings 12 and 14 in accordance with the present disclosure. Referring now to at least FIGS. 1-3, the vehicle latch 10 also includes a first locking mechanism 22 that is configured to disengage an outside release lever 32 from the pawl of the vehicle latch 10. The outside release lever 32 being rotationally mounted to the latch housing 12 and operably coupled to an outside handle 37 (illustrated schematically) via a cable 35 (illustrated schematically) or other equivalent structure such that actuation of the outside handle 37 will cause a corresponding movement of the outside release lever 32. However and if the first locking mechanism is actuated the outside release lever 32 is disengaged from the pawl and its movement will not open the vehicle latch 10. This may be referred to a locked state. The first locking mechanism 22 also includes a motor 26 for driving a worm 28 that rotates a gear 30 rotationally mounted to the actuator housing 14.

The vehicle latch 10 also includes an inside release lever 24 rotationally mounted to the actuator housing 14 and operably coupled to an inside handle 25 (illustrated schematically) via a cable 27 (illustrated schematically) or other equivalent structure such that actuation of the inside handle 25 will cause a corresponding movement of the inside release lever 24. Contrary to the outside release lever 32 and if the first locking mechanism 22 is actuated into a locked state and the inside release lever 24 is actuated twice the pawl of the vehicle latch 10 will be actuated. In other words, the first locking mechanism 22 completely disengages the outside release lever 32 however, the inside release lever 24 when actuated at least twice will still be able to release the vehicle latch 10 if actuated.

Referring now to FIGS. 1-10, a double lock mechanism 34 in accordance with the present disclosure is illustrated. The double lock mechanism 34 when actuated will disengage the inside release lever 24 from the pawl of the vehicle latch 10 such that when the double lock mechanism 34 is actuated such that it is in a locked state, rotation or movement of the inside release lever 24 regardless of how many times it is actuated it will not release the vehicle latch 10. As such, the vehicle latch 10 is in a double locked state. In addition, the double lock mechanism 34 when actuated will disengage the outside release lever 32 from the pawl of the vehicle latch 10 such that when the double lock mechanism 34 is actuated such that it is in a locked state, rotation or movement of the outside release lever 32 regardless of how many times it is actuated it will not release the vehicle latch 10.

As used herein release the vehicle latch 10 refers to an operation where the claw 20 of the vehicle latch 10 is able to rotate or move from a latched position wherein the striker is retained by the vehicle latch 10 to an unlatched position wherein the striker is no longer retained (e.g., released) by the vehicle latch 10.

The double lock mechanism 34 includes a motor 36 for driving a worm gear 38 that meshingly engages a sector gear 40 such that rotation of the worm 38 by motor 36 will cause pivotal or rotational movement of the sector gear 40. In one non-limiting embodiment, the sector gear 40 is rotationally mounted to the actuator housing 14. Also shown in at least FIGS. 10 and 11 a bumper 41 is provided to make contact with the sector gear as it rotates. The double lock mechanism 34 also includes a double lock link 42 operably or pivotally coupled to the sector gear 40 at one end and a double lock lever 44 at an opposite end. The double lock lever 44 is pivotally or rotationally mounted to the latch housing 12 such that rotational movement of the sector gear 40 will cause rotational movement of the double lock lever 44. The double lock lever 44 is also configured to cause rotational movement of an intermittent lever 46 also rotationally or pivotally mounted to the latch housing 12. The double lock mechanism 34 also includes an over center spring 39 having one end operably coupled to the sector gear 40 and another end secured to the housing 14. As such, rotation of the sector gear 40 is maintained in one of an engaged position of double lock mechanism 34 and a disengaged position of the double lock mechanism 34 until the biasing force of the over center spring 39 is overcome by rotation of the worm 38 by the motor 36.

Figure 5:
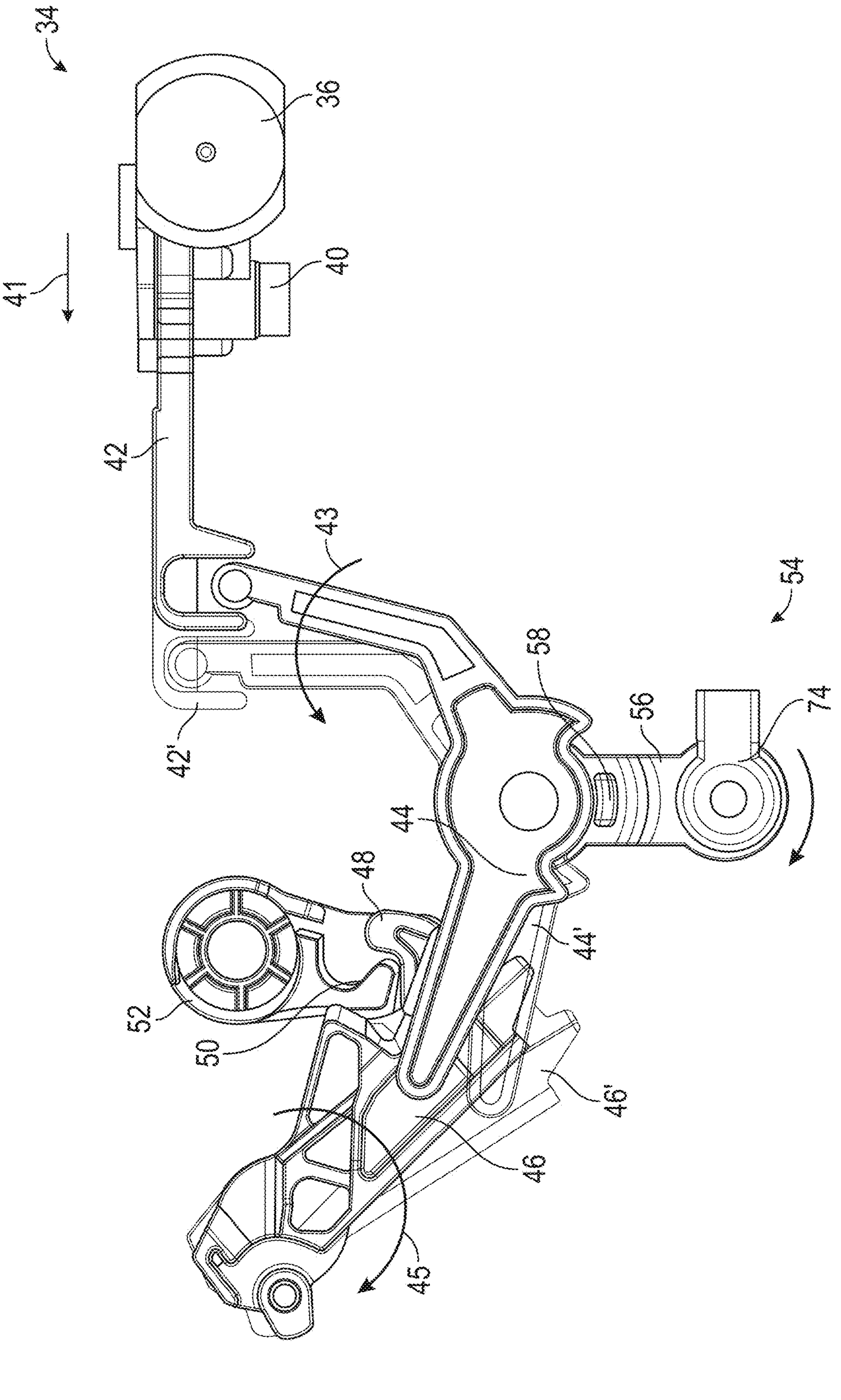
FIG. 5 illustrates operation of the double lock mechanism in accordance with the present disclosure.

Movement of the double lock mechanism 34 is illustrated in at least FIG. 5. For example, movement of the double lock link 42 in the direction of arrow 41 will cause movement of the double lock lever 44 in the direction of arrow 43, which in turn causes movement of the intermittent lever 46 in the direction of arrow 45. The movement of the double lock link 42, the double lock lever 44 and the intermittent lever 46 is illustrated in phantom in FIG. 5 with the following reference numerals 42', 44' and 46'. Once the intermittent lever 46 is illustrated in the position illustrated by 46' a feature 48 of the intermittent lever 46 is no longer in contact with a corresponding feature 50 of a pawl lifter 52. The pawl lifter 52 is operably coupled to the pawl of the vehicle latch 10 such that rotation of the pawl lifter 52 will cause the pawl to move from the engaged position to the disengaged position so that the claw 20 can rotate from a latched position to an unlatched position and the striker is no longer retained by the claw 20 of the latch 10.

The intermittent lever 46 is also operably coupled to the inside release lever 24 such that when the feature 48 of the intermittent lever 46 engages the feature of the pawl lifter 52 movement of the inside release lever 24 will via the intermittent lever 46 cause the pawl lifter 52 to rotate which in turn will cause the pawl to move from the engaged position to the disengaged position thus allowing the claw 20 to rotate from the latched position to the unlatched position. However and when the double lock mechanism 34 has been actuated such that the double lock link 42, the double lock lever 44 and the intermittent lever 46 are moved to the corresponding positions of 42', 44' and 46' movement of the intermittent lever 46 by the inside release lever 24 will not open the vehicle latch 10. Moreover and when the first locking mechanism 22 has also disengaged the outside release lever 32 from the pawl the and the double lock mechanism 34 has been actuated such that the double lock link 42, the double lock lever 44 and the intermittent lever 46 are moved to the corresponding positions of 42', 44' and 46' the vehicle latch is in a double locked state such that movement of the outside release lever 32 by an outside handle operably coupled thereto and/or movement of the inside release lever 24 by an inside handle operably coupled thereto will not cause movement of the pawl and thus the vehicle latch 10 will not be opened. Hence, the vehicle latch is in a double locked state.

Operation of the double lock mechanism 34 is independent of the first locking mechanism 22, which serves to couple and decouple the outside release lever 32 from the pawl of the vehicle latch 10.

The double lock mechanism 34 also includes a manual release mechanism 54 which can be used in the event of a power loss and/or the motor 36 of the double lock mechanism 34 is inoperable. The manual release mechanism 54 includes a key cylinder lever 56 also rotationally mounted to the latch housing 12. In one non-limiting embodiment, the key cylinder lever 56 rotates about the same axis as the double lock lever 44. The key cylinder lever 56 includes a tab portion or protrusion 58 that is located between a pair of features or tabs 70 and 72 of the double lock lever 44. The features or tabs 70 and 72 of the double lock lever 44 are spaced from each other such that movement of the double lock lever 44 by motor 36 may occur without contacting tab or protrusion 58 of the key cylinder lever 56. However and in the event of a power loss, the key cylinder lever 56 may be used to move the double lock lever 44. The key cylinder lever 56 is operably coupled to a key cylinder that is accessible with a key from the outside of the vehicle door. This feature will be typically available only on the forward door latch (e.g., a driver's side door and in some instances the passenger side door). At least one forward door of the vehicle will be equipped with the manual release mechanism 54.

Figure 6:
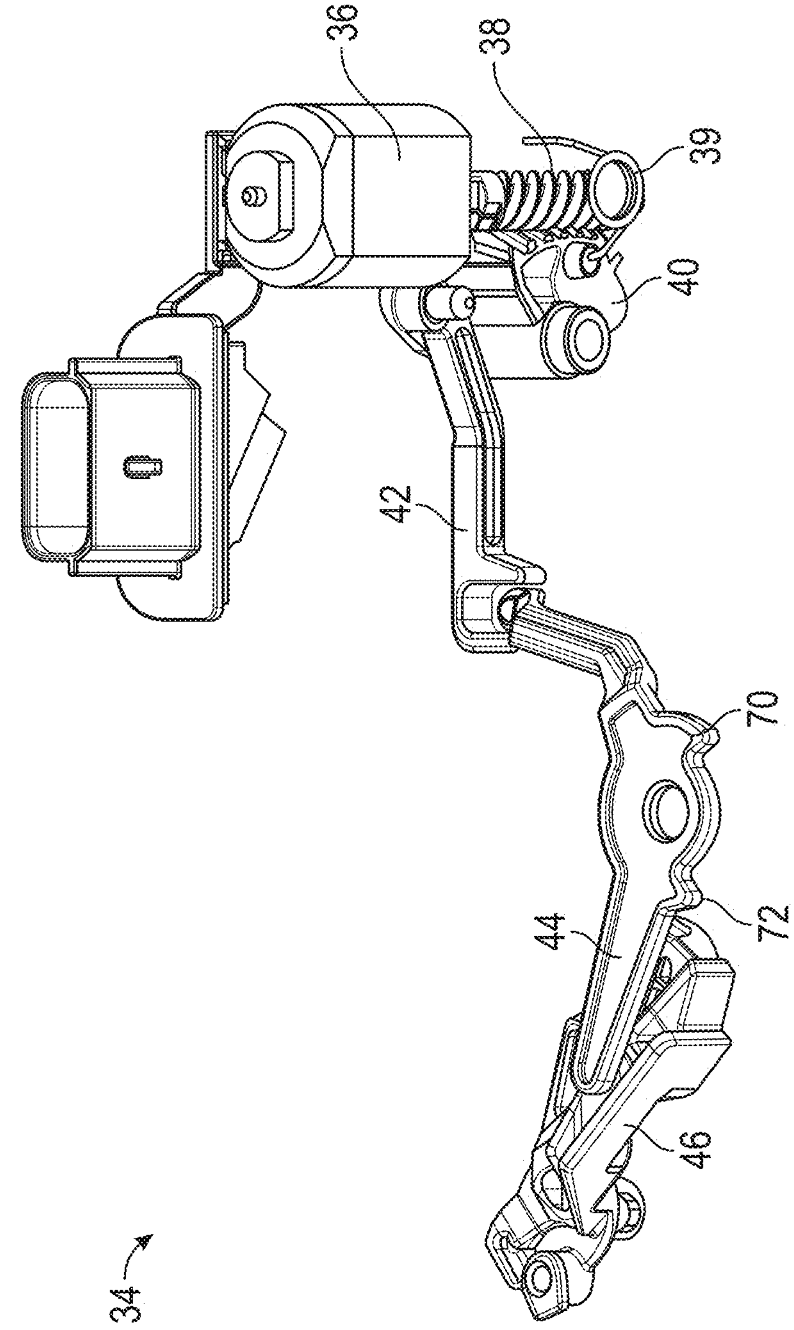
FIG. 6 is a perspective view of the double lock mechanism in accordance with the present disclosure.

FIG. 6 is a perspective view of the double lock mechanism 34 in accordance with the present disclosure.

Figure 7:
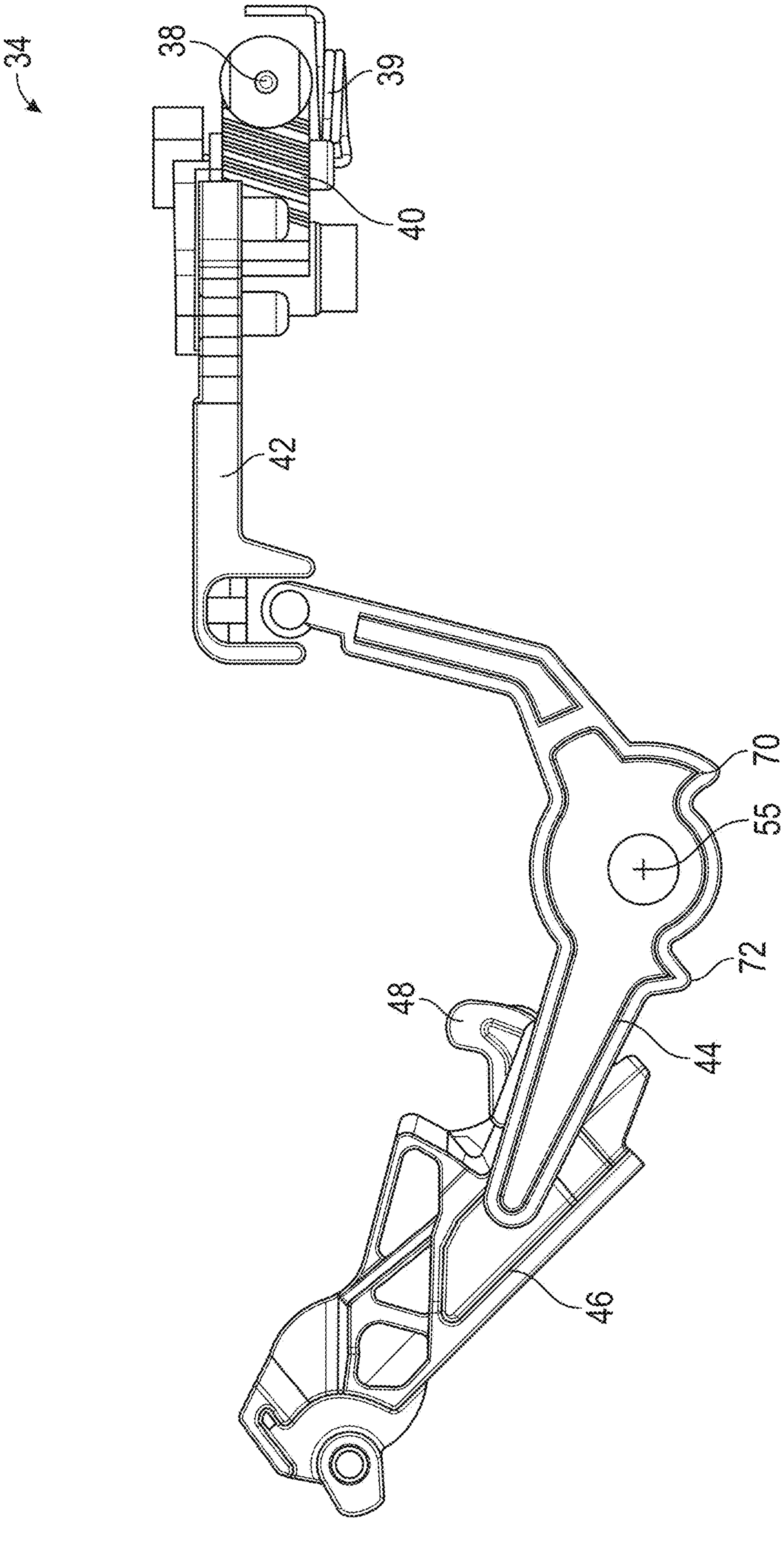
FIG. 7 is a perspective view of the double lock mechanism of the present disclosure in an unlock position.

FIG. 7 is a perspective view of the double lock mechanism 34 of the present disclosure in an unlock position. Here feature 48 of the intermittent lever 46 is engaged with the corresponding feature 50 of the pawl lifter 52 such that operation of the insider release lever 32 will open the vehicle latch 10.

Figure 8:
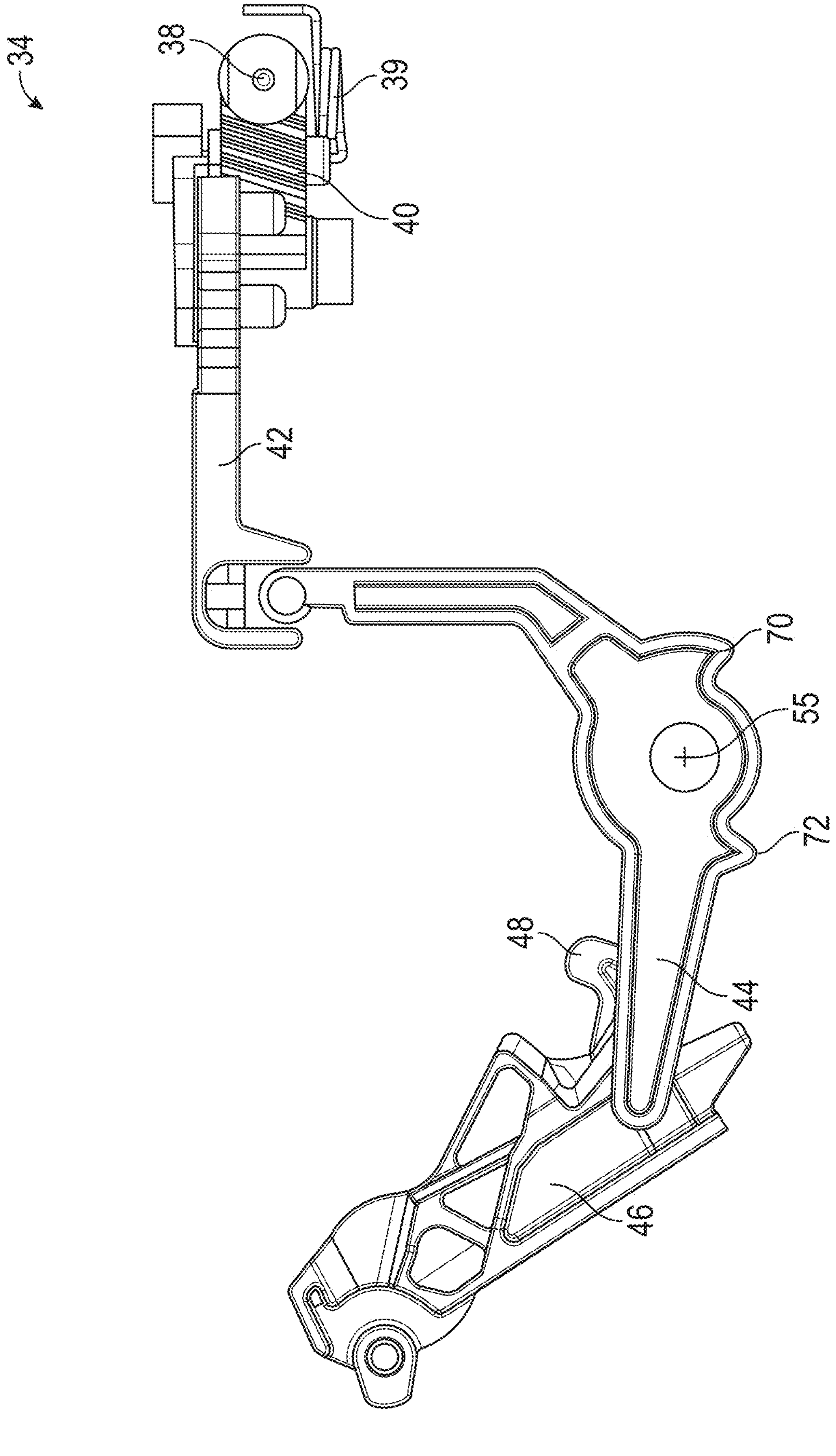
FIG. 8 is a perspective view of the double lock mechanism of the present disclosure in a double lock position.

FIG. 8 is a perspective view of the double lock mechanism 34 of the present disclosure in a double lock position. Here the intermittent lever 46, the double lock lever 44 and the double lock link 42 have been moved to the positions 46', 44' and 42' respectively and feature 48 of the intermittent lever 46 is no longer engaged with the corresponding feature 50 of the pawl lifter 52 such that operation of the insider release lever 32 will not open the vehicle latch 10.

Figure 9:
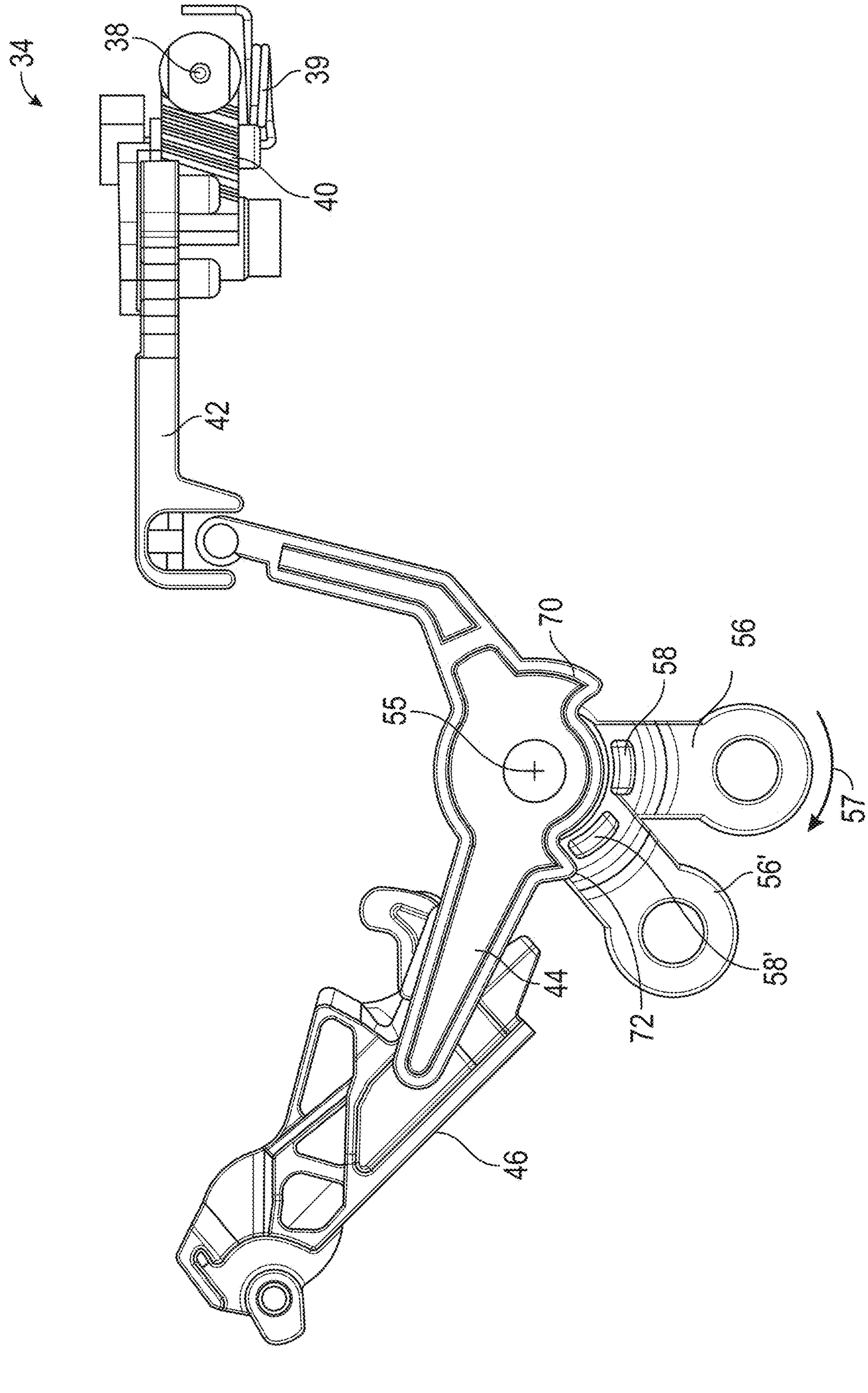
FIG. 9 is a view of the double lock mechanism of the present disclosure in a double lock position being actuated by a key cylinder lever.

FIG. 9 is a view of the double lock mechanism 34 of the present disclosure wherein the key cylinder lever 56 has been rotated in the direction of arrow 57 to the position illustrated by reference numeral 56' and protrusion 58 has contacted tab or feature 72 and rotated the double lock lever 44 into the position illustrated in FIG. 8. In other words movement of the key cylinder lever 56 in the direction of arrow 57 to the position of 56' will cause tab 58 to contact feature 72 and rotate the double lock lever 44 in the direction of arrow 57 from the double lock position illustrated in FIG. 8 to the unlocked position illustrated in FIG. 7.

The key cylinder lever 56 has includes a coupler 74 secured thereto. The coupler 74 extends from the cover 16 of the vehicle latch 10 and is secured to a rod 76 (see FIG. 1). The rod 76 extends to an item located on a surface portion of a vehicle door the vehicle latch is secured to in order to allow for the rod 76 to be pushed in the direction of arrow 78 thus, allowing for manual override of the double lock mechanism 34. For example and in one embodiment, the rod 76 is operably coupled to a key cylinder accessible via a key on an exterior surface of a door the vehicle latch is associated with such that operation of the key cylinder with a key will manipulate rod 76 and the manual release mechanism 54 can be actuated in order to disengage the double lock mechanism such that the inside release lever 24 and/or the outside release lever 32 can once again be operably coupled to the pawl lifter 52. In other words, if the double lock mechanism is in the double lock position illustrated in at least FIG. 8 and there is a power loss or motor failure, rod can be manipulated in order to move the double lock mechanism 34 from the double lock position (see at least FIG. 8) to the unlock position (see at least FIG. 7).

Figure 10:
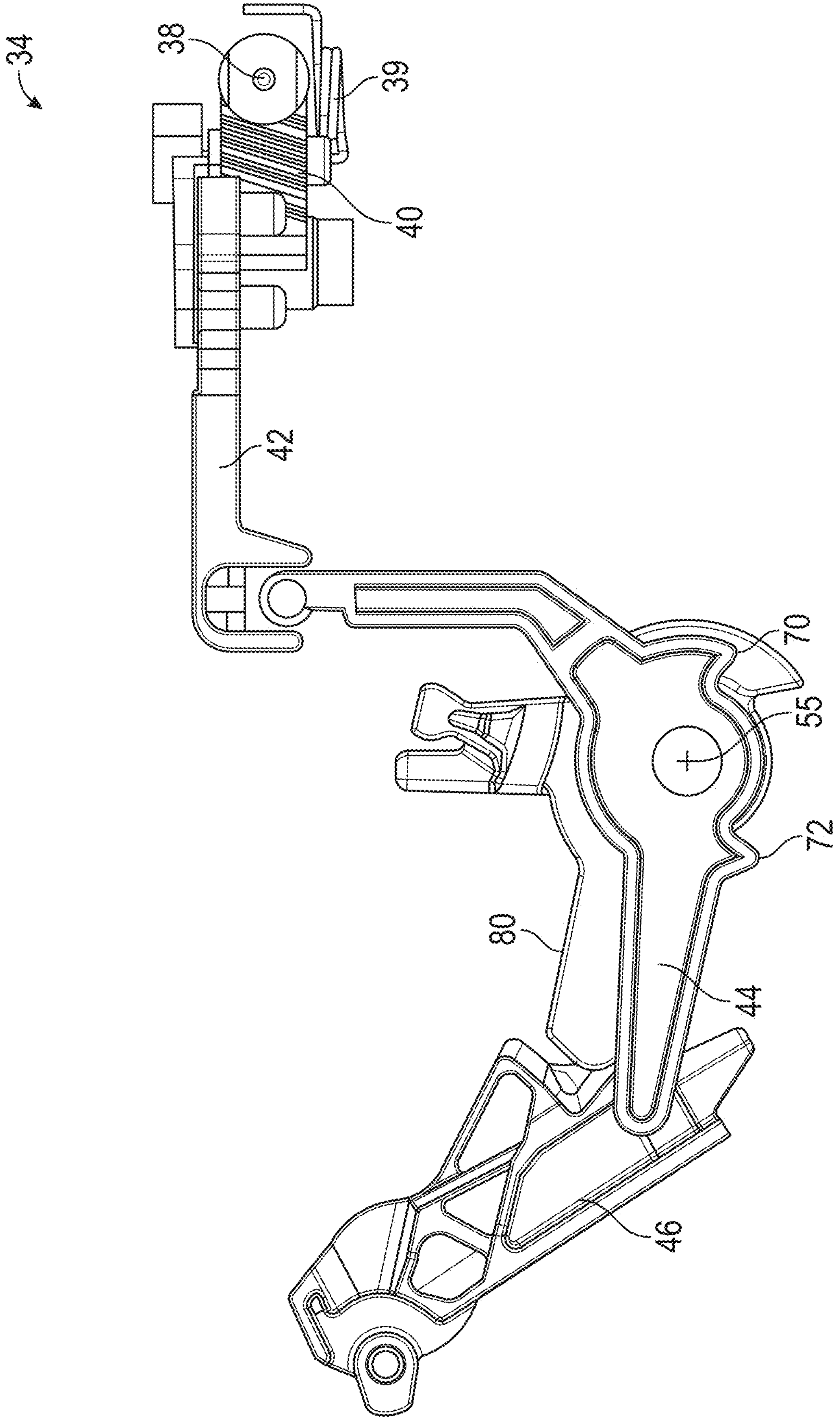
FIG. 10 is view illustrating that the double lock mechanism operates independently of a lock system.

FIG. 10 illustrates that the double lock lever 44 of the double lock mechanism 34 operates independently of a lever 80 of the first locking mechanism 22. Lever 80 is rotated about the same axis 55 by gear 30 of the first locking mechanism 22. In other words, lever 80 is operable coupled to gear 30 and movement of lever 80 by gear 30 causes lever 80 to either couple the outside release lever 24 to the pawl lifter 52 (unlocked state) or uncoupled the outside release lever 24 from the pawl lifter 52 (locked state).

In accordance with various embodiments of the present disclosure movement of lever 80 is independent of the double lock lever 44.

In one non-limiting embodiment, the double lock mechanism 34 can be operated electrically through a key fob or switch operably coupled to the motor 36.

In one non-limiting embodiment or as an alternative to any of the preceding embodiments, the double lock mechanism 34 can be configured that it can only be activated (e.g., place the vehicle latch 10 into a double locked) when the vehicle it is associated with is stationary or not moving such as a parked state or when the vehicle is not operating. This may be achieved by sensors (e.g., accelerometers, etc.) 82 (illustrated schematically) in operable communication with a controller, microprocessor, microcontroller or other equivalent processing device 84 capable of executing commands of computer readable data or program for executing a control algorithm that controls the operation of the double lock mechanism 34. In order to perform the prescribed functions and desired processing, as well as the computations therefore (e.g., the execution of fourier analysis algorithm(s), the control processes prescribed herein, and the like), the controller may include, but not be limited to, a processor(s), computer(s), memory, storage, register(s), timing, interrupt(s), communication interfaces, and input/output signal interfaces, as well as combinations comprising at least one of the foregoing. For example, the controller 84 may include input signal filtering to enable accurate sampling and conversion or acquisitions of such signals from communications interfaces.

For example, the controller, microprocessor, microcontroller or other equivalent processing device 84 can receive inputs from one or more sensors 82 such as, but not limited to, accelerometers, inputs received from vehicle components, etc. The sensors 82 provide input signals the controller, microprocessor, microcontroller or other equivalent processing device 84 in order to determine if the double lock mechanism 34 can place the vehicle latch 10 into a double locked state.

Of course, other modes of operation of the double lock mechanism 34 are contemplated to be within the scope of various embodiments of the present disclosure.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A vehicle latch, comprising:

a first locking mechanism configured to disengage an outside release lever of the vehicle latch from a pawl of the vehicle latch, the first locking mechanism includes a motor for driving a worm that rotates a gear; and a double lock mechanism configured to disengage an inside release lever from the pawl of the vehicle latch such that when the double lock mechanism is actuated into a locked state, movement of the inside release lever will not release the vehicle latch, the double lock mechanism includes a motor for driving a worm gear that meshingly engages a sector gear such that rotation of the worm gear by the motor of the double lock mechanism will cause rotational movement of the sector gear, the double lock mechanism also includes a double lock link coupled to the sector gear at one end by a pin and operably coupled to a double lock lever at an opposite end, the double lock lever being rotationally mounted to a latch housing of the vehicle latch such that the rotational movement of the sector gear will cause rotational movement of the double lock lever, wherein the double lock mechanism also includes an over center spring having one end operably coupled to the sector gear and another end secured to an actuator housing of the vehicle latch, wherein the double lock mechanism also includes a manual release mechanism, the manual release mechanism having a key cylinder lever rotationally mounted to the latch housing of the vehicle latch and the key cylinder lever rotates about an axis that is the same as an axis of the rotational movement of the double lock lever.

2. The vehicle latch as in claim 1, wherein the rotational movement of the double lock lever will cause rotational movement of an intermittent lever rotationally mounted to the latch housing.

3. The vehicle latch as in claim 2, wherein the intermittent lever includes a feature for contacting a corresponding feature of a pawl lifter of the vehicle latch, the pawl lifter being rotationally mounted to the latch housing and operably coupled to the pawl such that rotation of the pawl lifter will cause the pawl to move from an engaged position, where the pawl engages a claw pivotally mounted to a backing plate of the vehicle latch, to a disengaged position where the claw is free to rotate from a latched position to an unlatched position.

4. The vehicle latch as in claim 2, wherein the double lock lever of the double lock mechanism operates independently of a lever of the first locking mechanism.

5. The vehicle latch as in claim 4, wherein the lever of the first locking mechanism is rotated by the gear of the first locking mechanism.

6. The vehicle latch as in claim 1, wherein operation of the double lock mechanism is independent of the first locking mechanism.

7. The vehicle latch as in claim 1, wherein the double lock mechanism also includes a manual release mechanism, the manual release mechanism having a key cylinder lever rotationally mounted to the latch housing of the vehicle latch.

8. The vehicle latch as in claim 1, wherein the double lock mechanism also includes a manual release mechanism, the manual release mechanism having a key cylinder lever rotationally mounted to the latch housing of the vehicle latch and the key cylinder lever rotates about an axis that is the same as an axis of the rotational movement of the double lock lever, the key cylinder lever including a tab portion that is located between a pair of features of the double lock lever, wherein the pair of features of the double lock lever are spaced from each other such that the rotational movement of the double lock lever by the motor of the double lock mechanism may occur without contacting the tab portion of the key cylinder lever.

9. The vehicle latch as in claim 8, wherein the key cylinder lever includes a coupler secured thereto, the coupler extending from a cover of the vehicle latch and the coupler is secured to a rod, the rod allowing for a manual override of the double lock mechanism.

10. A method of double locking a vehicle latch, the method comprising:

disengaging an outside release lever of the vehicle latch from a pawl of the vehicle latch with a first locking mechanism, the first locking mechanism includes a motor for driving a worm that rotates a gear; and disengaging an inside release lever from the pawl of the vehicle latch with a double lock mechanism such that when the double lock mechanism is actuated into a locked state, movement of the inside release lever will not release the vehicle latch, the double lock mechanism includes a motor for driving a worm gear that meshingly engages a sector gear such that rotation of the worm gear by the motor of the double lock mechanism will cause rotational movement of the sector gear, the double lock mechanism also includes a double lock link coupled to the sector gear at one end by a pin and operably coupled to a double lock lever at an opposite end, the double lock lever being rotationally mounted to a latch housing of the vehicle latch such that rotational movement of the sector gear will cause the rotational movement of the double lock lever, wherein the double lock mechanism also includes an over center spring having one end operably coupled to the sector gear and another end secured to an actuator housing of the vehicle latch, wherein the double lock mechanism also includes an over center spring having one end operably coupled to the sector gear and another end secured to an actuator housing of the vehicle latch, wherein the double lock mechanism also includes a manual release mechanism, the manual release mechanism having a key cylinder lever rotationally mounted to the latch housing of the vehicle latch and the key cylinder lever rotates about an axis that is the same as an axis of the rotational movement of the double lock lever.

11. The method as in claim 10, wherein the rotational movement of the double lock lever will cause the rotational movement of an intermittent lever rotationally mounted to the latch housing.

12. The method as in claim 11, wherein the intermittent lever includes a feature for contacting a corresponding feature of a pawl lifter of the vehicle latch, the pawl lifter being rotationally mounted to the latch housing and operably coupled to the pawl such that rotation of the pawl lifter will cause the pawl to move from an engaged position, where the pawl engages a claw pivotally mounted to a backing plate of the vehicle latch, to a disengaged position where the claw is free to rotate from a latched position to an unlatched position.

* * * * *